United States Patent
Cobb (10) Patent No.: US 10,661,897 B2
(45) Date of Patent: May 26, 2020

(54) VERTICAL TAKEOFF AND LANDING AIRCRAFT HAVING TELESCOPING BOOM FOR LATERAL PAYLOAD DEPLOYMENT COUNTERBALANCED THROUGH MULTI-AXIS THRUST VECTORING

(71) Applicant: Nathan Ian Cobb, Guthrie, OK (US)

(72) Inventor: Nathan Ian Cobb, Guthrie, OK (US)

(*) Notice: Subject to any disclaimer, the term of this patent is extended or adjusted under 35 U.S.C. 154(b) by 274 days.

(21) Appl. No.: 15/653,522

(22) Filed: Jul. 18, 2017

(65) Prior Publication Data

US 2018/0016004 A1  Jan. 18, 2018

Related U.S. Application Data

(60) Provisional application No. 62/363,700, filed on Jul. 18, 2016.

(51) Int. Cl.
*B64C 39/02* (2006.01)
*B64C 1/30* (2006.01)
*B64C 29/02* (2006.01)

(52) U.S. Cl.
CPC .......... *B64C 39/024* (2013.01); *B64C 1/30* (2013.01); *B64C 29/02* (2013.01); *B64C 2201/108* (2013.01); *B64C 2201/128* (2013.01)

(58) Field of Classification Search
CPC ......... B64C 39/024; B64C 1/30; B64C 29/02; B64C 2201/108; B64C 2201/128
See application file for complete search history.

(56) References Cited

U.S. PATENT DOCUMENTS

| | | |
|---|---|---|
| 1,519,866 A | 12/1924 | Alessandro |
| 1,870,674 A | 8/1932 | Josef |
| 2,418,274 A | 4/1947 | Nemeth |
| 4,482,110 A | 11/1984 | Crimmins |
| 7,093,788 B2 | 8/2006 | Small |
| 8,083,173 B2 * | 12/2011 | Arlton ............... B64C 39/024 244/17.23 |
| 8,172,173 B2 * | 5/2012 | Carlson ............... B64D 19/02 244/138 A |
| 9,764,828 B2 * | 9/2017 | Ulrich ............... B64C 27/16 |
| 2006/0011777 A1 * | 1/2006 | Arlton ............... B64C 27/10 244/7 B |
| 2007/0164146 A1 | 7/2007 | Stephens |
| 2008/0302920 A1 | 12/2008 | Mack |
| 2010/0025526 A1 * | 2/2010 | Lawrence ............ B64C 39/024 244/17.23 |
| 2014/0091172 A1 * | 4/2014 | Arlton ............... B64C 27/14 244/17.23 |
| 2015/0028155 A1 * | 1/2015 | Reiter ............... B64C 27/16 244/39 |
| 2015/0239578 A1 * | 8/2015 | McGeer ............... B64F 1/02 244/110 R |
| 2015/0307191 A1 * | 10/2015 | Samuel ............... B64C 33/02 244/22 |

* cited by examiner

*Primary Examiner* — Assres H Woldemaryam (57) ABSTRACT

An unmanned aircraft using a multi-axis thrust vectoring system in combination with a telescoping boom assembly to deposit or retrieve packages vertically or laterally from a safe distance to or from various locations including but not limited to lawns, patios, porches, balconies, and windows. Other embodiments are described.

2 Claims, 8 Drawing Sheets

VERTICAL TAKEOFF AND LANDING AIRCRAFT HAVING TELESCOPING BOOM FOR LATERAL PAYLOAD DEPLOYMENT COUNTERBALANCED THROUGH MULTI-AXIS THRUST VECTORING

CROSS-REFERENCE TO RELATED APPLICATIONS

See Application Data Sheet (ADS) 37 CFR 1.76.

FEDERALLY SPONSORED RESEARCH

Not applicable

PARTIES TO A JOINT RESEARCH AGREEMENT

Not Applicable

SEQUENCE LISTING OR PROGRAM

Not Applicable

BACKGROUND

The physical delivery of packages using Unmanned Aerial Vehicles (UAVs) has emerged as a potential alternative and/or supplement to more traditional package delivery methods. Given the requirement of UAV delivery vehicles to operate in close proximity to our homes and businesses, it stands to reason that any UAV attempting to insert itself into the current package delivery ecosystem should, among other attributes, be relatively quiet so as not to be a public nuisance, should not endanger children or animals with its presence, should be capable of operating in inclement weather, and should be capable of delivering packages to a variety of commercial and residential structures, including office buildings, dorms, houses, and apartments.

BRIEF DESCRIPTION OF THE DRAWINGS

The disclosure below refers to the accompanying drawings, wherein like reference numerals refer to like parts throughout the drawings and in which.

DETAILED DESCRIPTION

Figure 1:
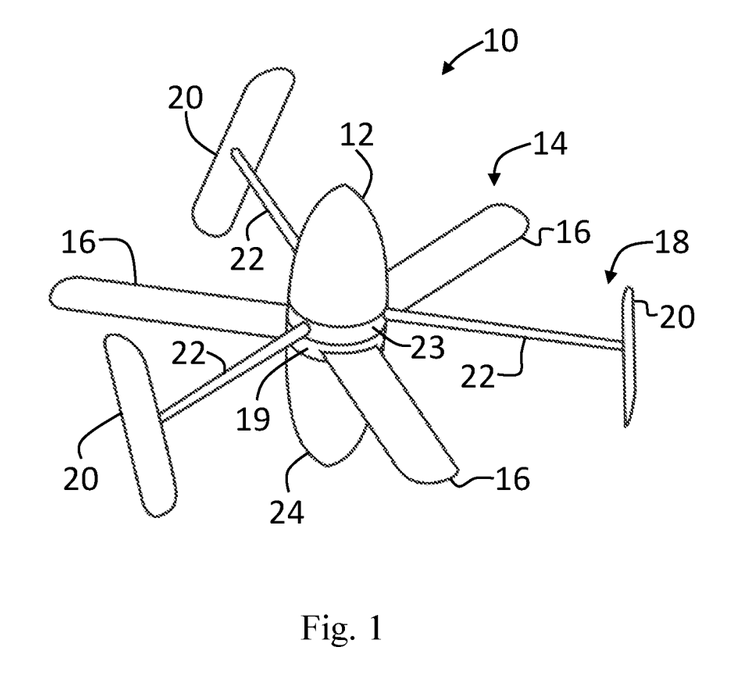
FIG. 1 shows a perspective view of an aircraft in accordance with one embodiment.
Figure 2:
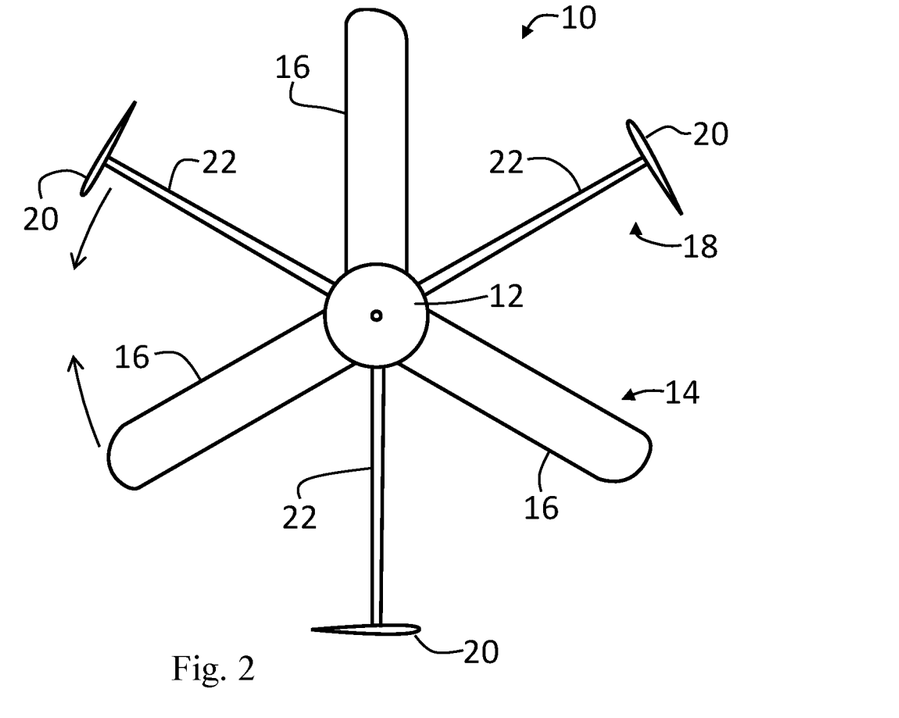
FIG. 2 shows a top plan view of an aircraft in accordance with one embodiment.
Figure 3:
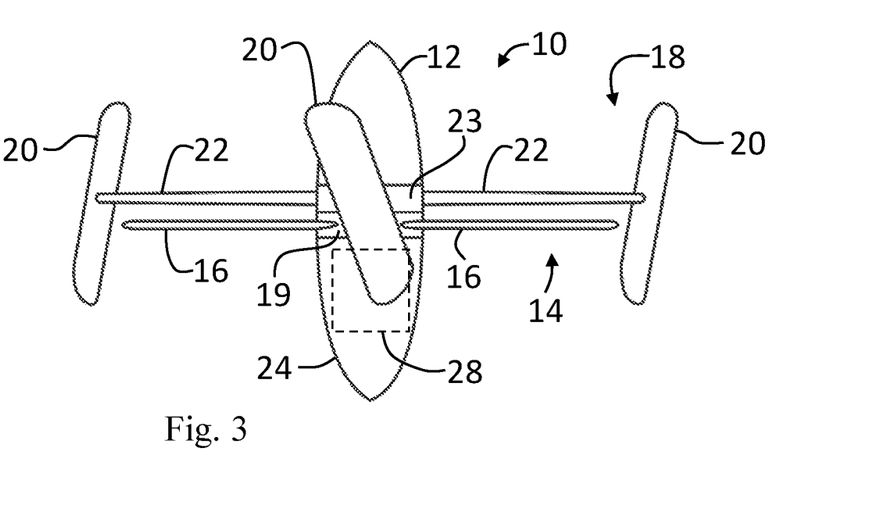
FIG. 3 shows a side elevation view of an aircraft in accordance with one embodiment.
Figure 4:
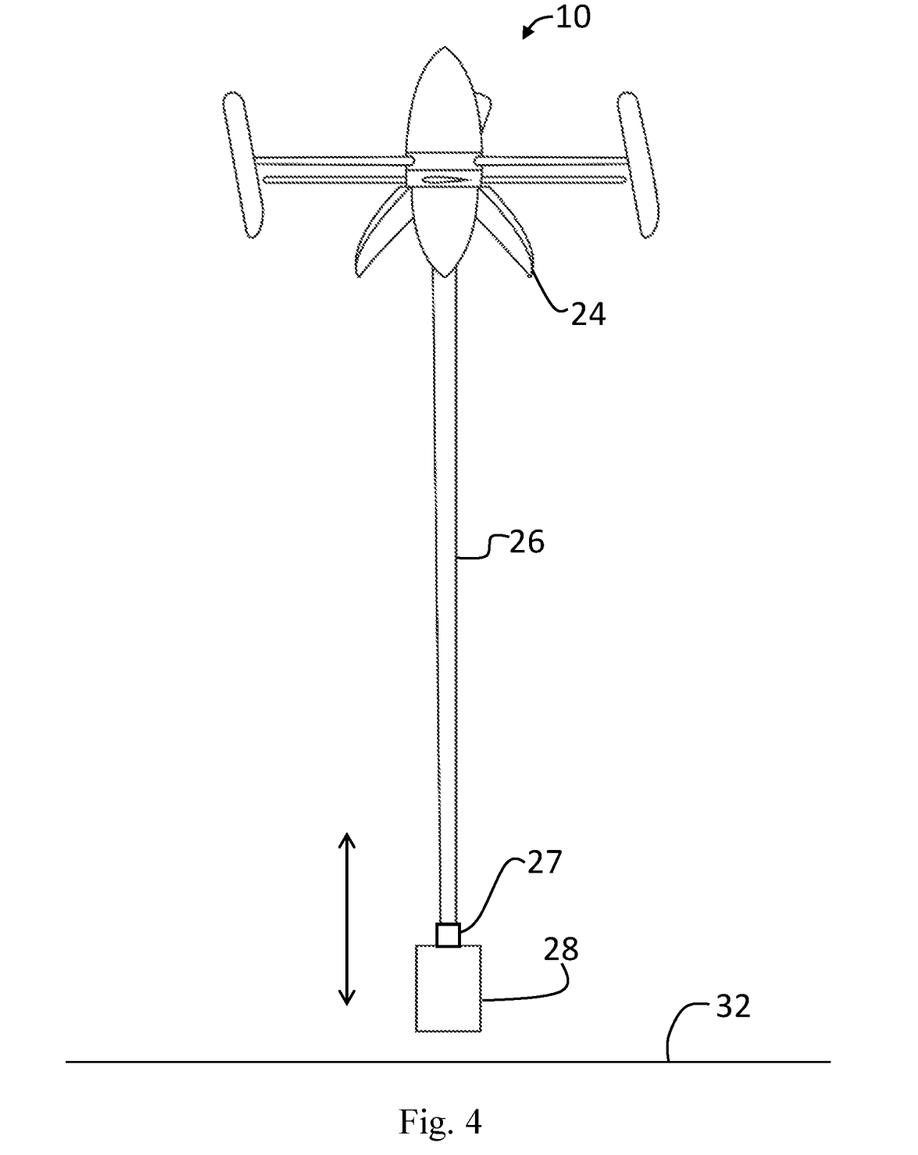
FIG. 4 shows a side elevation view of a vertical payload deployment and/or retrieval by an aircraft in accordance with one embodiment.

In accordance with one embodiment, FIGS. 1, 2, 3, and 4 depict an aircraft 10 which includes a fuselage, frame, or body 12, a rotor assembly 14, a cyclorotor assembly 18, and a telescoping boom assembly 26 (FIG. 4).

The body 12 serves as the central mounting point for the major assemblies of the aircraft 10 and may include a payload fairing 24. The payload fairing 24 of the present embodiment is illustrated as a tri-section fairing that opens and closes as required and, when open, provides the aircraft 10 with landing legs.

Figure 8:
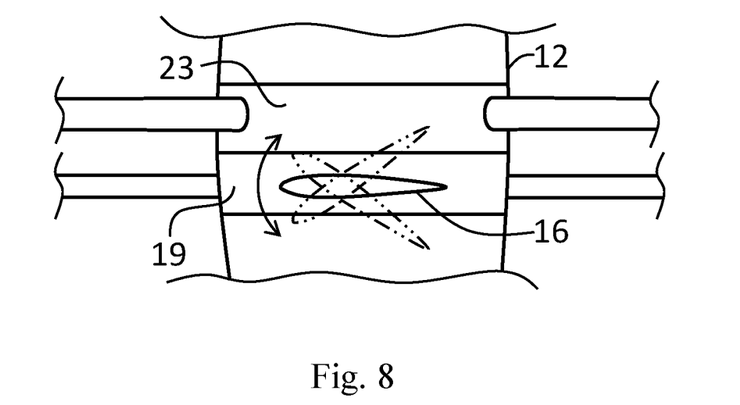
FIG. 8 shows a side elevation view of a rotor blade pivotable in pitch in accordance with one embodiment.

The rotor assembly 14 is rotatably mounted to the body 12 and includes a plurality of rotor blades 16 pivotally mounted to a first hub 19. The pivot line of the rotor blade 16 extends radially from the first hub 19. The pitch of each rotor blade 16 (FIG. 8) is controlled using a swash plate system or other suitable actuation system. The rotation of the rotor assembly 14 is driven by one or more motors.

Figure 9:
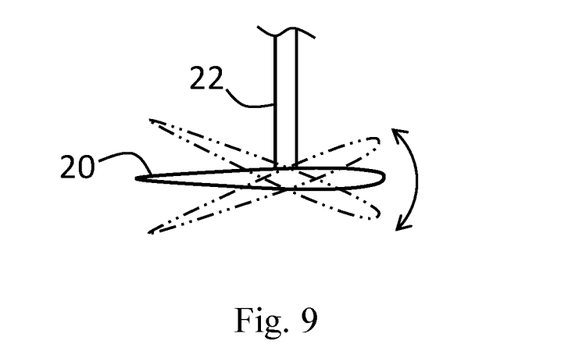
FIG. 9 shows a top plan view of a wing surface pivotable in pitch in accordance with one embodiment.

The cyclorotor assembly 18 is rotatably mounted to the body 12 substantially coaxial with the rotor assembly 14 and includes a plurality of spokes 22 projecting radially from a second hub 23. At the end of each spoke 22 is mounted a pivotable wing surface 20 oriented generally perpendicular to the spoke 22. The pitch of each pivotable wing surface 20 (FIG. 9) is controlled using a swash plate system or other suitable actuation system. The pivotable wing surfaces 20 are shown with a slight sweep but other sweep angles are considered. The rotation of the cyclorotor assembly 18 is driven by one or more motors.

The telescoping boom assembly 26 (FIG. 4) is a sufficiently rigid extensible structure mounted to the body 12 generally coaxial with the rotor assembly 14 and is configured and actuated such that it can maintain any intermediate extension length between full retraction and full extension. Any mechanism or element 27 suitable for interfacing with a payload or package 28 may be affixed to the end of the telescoping boom assembly 26 as required.

Operation

In accordance with one embodiment, the cyclorotor assembly 18 and the rotor assembly 14 rotate about the same axis, at appropriate speeds, in opposite directions while the pivotable wing surfaces 20 and the rotor blades 16 are actuated as required to control the flight of the aircraft.

The rotor assembly 14 produces and vectors thrust through collective and cyclic pitch control of the rotor blades 16. By collectively increasing or decreasing the pitch of the rotor blades 16 the rotor assembly 14 can be made to quickly generate lift along the longitudinal axis of the aircraft 10. And by cyclically varying the pitch of each rotor blade 16 as the rotor assembly 14 rotates the rotor assembly 14 can be made to generate lift asymmetrically such that an overturning moment can be quickly produced about any axis perpendicular to the longitudinal axis of the aircraft 10.

The operation of the cyclorotor assembly 18 is conceptually similar to that of a typical cyclorotor in that it produces thrust by cyclically varying the pitch of each pivotable wing surface 20 as the cyclorotor assembly 18 rotates. By coordinating the pitch variations of each pivotable wing surface 20 the net thrusting force can be quickly vectored in any direction normal to the longitudinal axis of the aircraft.

Both the cyclorotor assembly 18 and the rotor assembly 14 are driven by motors mounted to the aircraft body 12.

Each motor naturally imparts a reaction torque to the body 12 which tends to rotate the body 12 about its longitudinal axis. By driving the rotor assembly 14 and the cyclorotor assembly 18 in opposite directions and by coordinating the magnitude of their respective reaction torques, the rotation of the body 12 about its longitudinal axis can be prevented or controlled as desired.

Figure 5A:
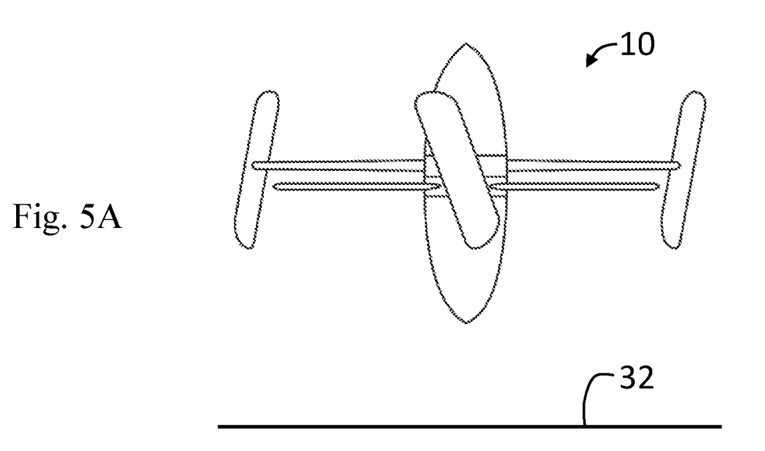
FIGS. 5A, 5B, and 5C show side elevation views of several flight modes of an aircraft in accordance with one embodiment.
Figure 5B:
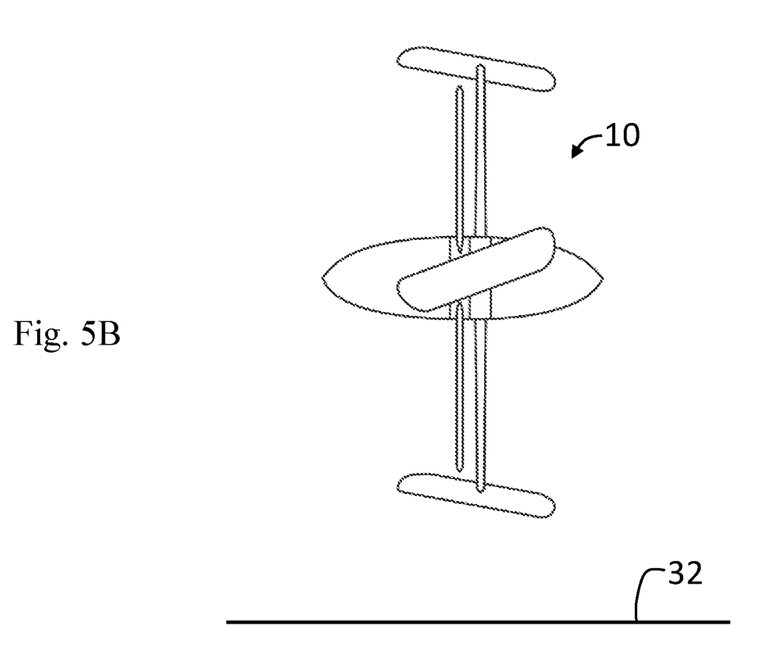
Figure 5C:
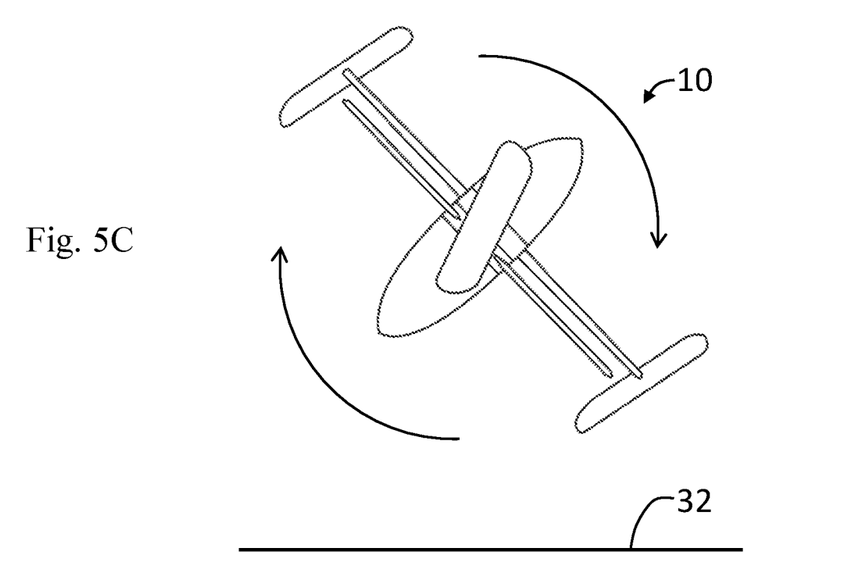
Figure 6:
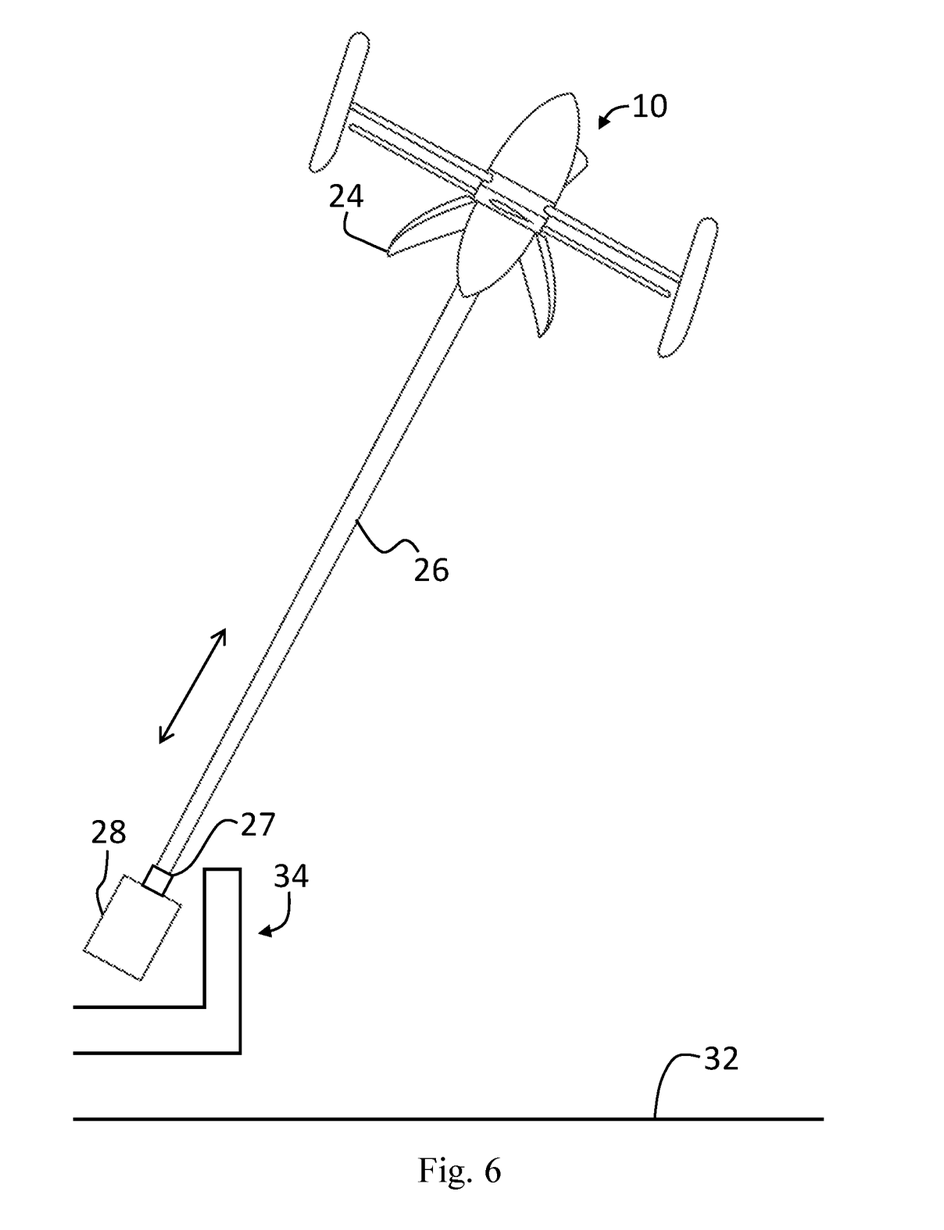
FIG. 6 shows a side elevation view of a diagonal payload deployment and/or retrieval by an aircraft in accordance with one embodiment.

Combining the thrust vectoring and overturning moment generating capabilities of the cyclorotor assembly 18 and the rotor assembly 14, the aircraft 10 is able to generate net thrust in any direction while simultaneously generating overturning moments as required to balance the aircraft 10 over a wide range of weight distributions. This multi-axis thrust vectoring capability gives the aircraft 10 the unusual ability to hover in several distinct orientations and to translate in any direction while maintaining a particular orientation (FIG. 5A thru FIG. 7 depict the ground plane 32 for orientation reference). Common flight modes envisioned are upright hovering and flight (FIG. 5A), horizontal hovering and high-speed flight (FIG. 5B), and hovering while transitioning between upright and horizontal orientations (FIG. 5C). Note that in FIG. 5A, all of the vertical lift is provided by the rotor assembly 14 whereas in FIG. 5B all of the vertical lift is provided by the cyclorotor assembly 18. And in FIG. 5C, the vertical lift is provided by the coordination of the thrusts produced by the rotor assembly 14 and the cyclorotor assembly 18. But in all cases, the control or balance of the aircraft is achieved through careful coordination of the thrusts and moments generated by the rotor assembly 14 and the cyclorotor assembly 18.

Figure 7:
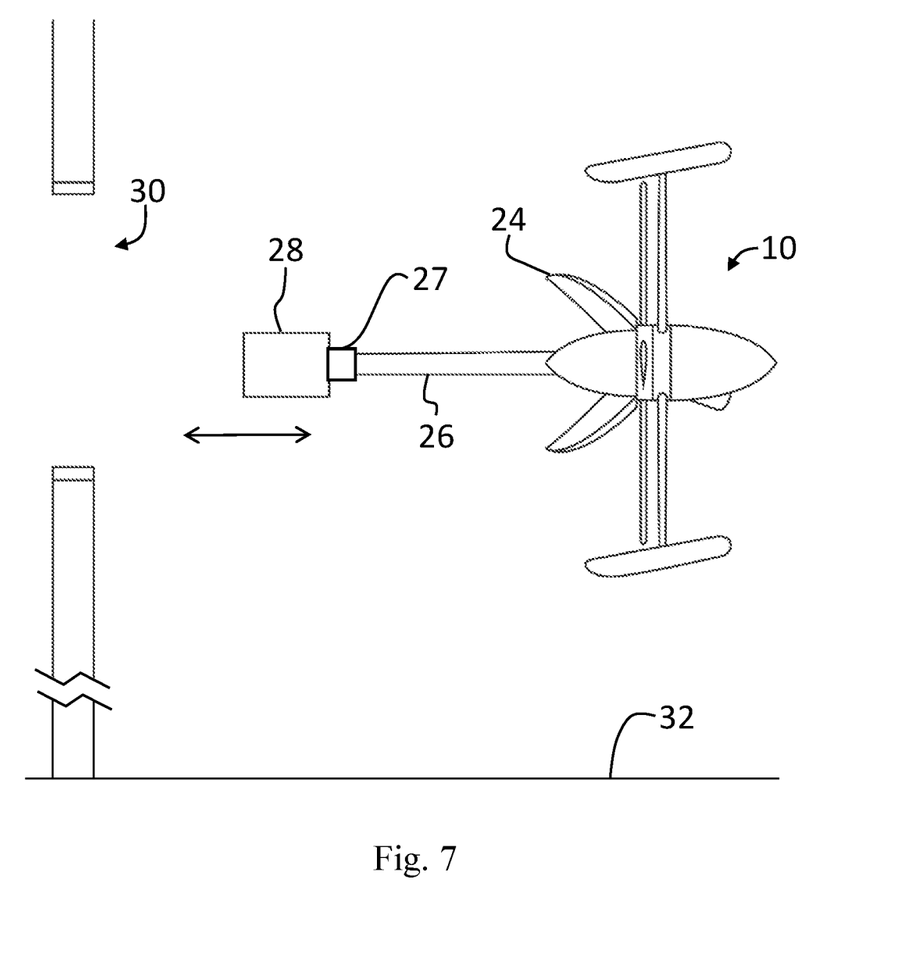
FIG. 7 shows a side elevation view of a lateral payload deployment and/or retrieval by an aircraft in accordance with one embodiment.

In addition, the ability of the aircraft 10 to generate and quickly modulate a large overturning moment enables the aircraft 10 to maintain or adjust its orientation while extending or retracting the telescoping boom assembly 26. This capability enables the aircraft to deploy payloads diagonally, such as on to a balcony or a porch 34 (FIG. 6), or laterally, such as into a window 30 (FIG. 7). For a given package weight, this capability is limited primarily by the maximum overturning moment that can be generated by the rotor assembly 14.

Advantages

From the present disclosure, a number of advantages of one or more aspects become evident:

Reduced Noise: In general, it is well known that a large diameter rotor of a given disk area A producing X amount of thrust will generate less noise than several smaller diameter rotors collectively of the same disk area A producing the same X amount of thrust. It is for this reason that the aircraft 10 described herein generates less noise than a comparably sized vertical takeoff and landing UAV with multiple small diameter propellers.

Improved Wind Resistance: Conventional aerial delivery vehicles with multiple small propellers are notoriously unsteady in windy conditions whereas the ability of the aircraft 10 described herein to quickly vector thrust in any direction, while simultaneously maintaining its orientation, makes it uniquely well suited to execute more precise and deliberate maneuvers in windy environments.

Operational Safety: The implementation of a sufficiently long telescoping boom 26 enables the aircraft 10 to deposit packages while hovering safely out of reach of children and animals. In addition, the ability of the aircraft 10 to extend packages diagonally or laterally enables the aircraft 10 to deposit packages through natural protective barriers such as windows and also enables the aircraft to deposit packages without hovering directly above the intended deposit location.

Delivery Versatility: As disclosed, the inherent capabilities of the aircraft 10 give it the unique ability to deliver packages to a wide array of commercial and residential structures including office buildings, dorms, houses, and apartments, regardless of their proximity to a field or open yard, or lack thereof.

Alternatives and Variations

Those of ordinary skill in the art will understand and appreciate the existence of alternatives, variations, combinations, and equivalents of the specific embodiment herein. The subject of the disclosure should therefore not be limited by the above described embodiment, but by all embodiments and methods within the scope and spirit of the disclosure. Such embodiments may include but are not limited to the following:

Variations in the structure of the body 12 including but not limited to the use of monocoque structures, truss structures, frame structures, etc., or any combination thereof.

Variations in the configuration of the payload fairing 24 including but not limited to alternate articulation schemes, static installations, removable installations, partial or total exclusion, etc.

Variations in the design of applicable alighting gear including but not limited to the use of posts, legs, hooks (for hanging from a perch, cable or other similar structure), wheels, skids, suspension, etc.

Variations in the shape, extent, and layout of the body 12 (with or without a payload fairing 24) including but not limited to the addition of features such as fins, camera domes, air data probes, auxiliary payload bays, etc.

Variations in the number of rotor assemblies 14, and cyclorotor assemblies 18.

Variations in the number of rotor blades 16 per rotor assembly 14.

Variations in the number of pivotable wing surfaces 20 per cyclorotor assembly 18.

Variations in the displacement, and/or the relative order of the rotor assembly(s) 14 and the cyclorotor assembly(s) 18.

Variations in the shape, size, and configuration of the pivotable wing surfaces 20 including but not limited to the use of one or more of the following: control surfaces, fences, lift enhancing features, noise reducing features, spoilers, winglets, dihedral, anhedral, sweep, taper, cant angle, morphing geometry, two or three-axis articulation, vortex generators, etc.

Variations in the shape, size, and configuration of the rotor blades 16 including but not limited to the use of one or more of the following: reverse taper, control surfaces, fences, lift enhancing features, noise reducing features, spoilers, winglets, dihedral, anhedral, sweep, taper, cant angle, morphing geometry, two or three-axis articulation, vortex generators, etc.

Combinations of features of the cyclorotor assembly 18 and the rotor assembly 14 to form hybrid rotor assemblies.

Variations in the control systems and actuation systems of the rotor assembly 14, rotor blades 16, cyclorotor assembly 18, and wing surfaces 20.

Variations in the configuration of the spokes 22 of the cyclorotor assembly 18, including but not limited to altering their shape, giving them an aerodynamic cross-section (with or without pitch control), supporting them with guy-wires and/or struts, etc.

Variations in the type of payloads accommodated including but not limited to deployable and non-deployable payloads such as food containers, camera pods, scientific instruments, spotlights, etc.

Variations in the configuration and articulation of the telescoping boom assembly 26 including but not limited to the use of various types of extensible structures (presently known and unknown), break-away features, and/or the addition of guy-wires and/or other such stabilizing features.

Variations in the integration of the telescoping boom assembly 26 with the body 12 including but not limited to using a portion of the telescoping boom assembly 26 as an integral component of the body 12 structure or other such synergistic arrangement.

Variations in the design and articulation of payload mounting provisions 27 attached to the telescoping boom assembly 26 including but not limited to the use of mechanized grappling claws, magnetic structures, custom payload adapters, etc.

Variations in the number, types, and combinations of motors and power supplies used to drive and power the aircraft 10.

Implementation of any number of relevant aviation and robotics systems to provide, for example but not limited to, communication, situational awareness, health monitoring, guidance & navigation, flight control, etc.

CONCLUSION AND SCOPE

Accordingly the reader will see that at least one embodiment of the subject of the present disclosure provides an aircraft configuration versatilely suited for the aerial delivery and deployment of packages and payloads.

While the above description contains much specificity, these details should not be construed as limitations in the scope of any embodiment, but as illustrative exemplifications of various embodiments thereof. Further still, it should be appreciated that various modifications may be made to the subject of the present disclosure without deviating from the spirit and scope of the appended claims.

What is claimed is:

1. A powered aircraft, comprising:
    a body;
    a rotor assembly comprising a first hub and a plurality of rotor blades extending radially from said first hub, said rotor blades pivotable in pitch;
    a cyclorotor assembly comprising a second hub, a plurality of spokes extending radially from said second hub, and a plurality of wing surfaces coupled to said spokes, said wing surfaces pivotable in pitch; and
    a telescoping boom assembly, wherein:
        said rotor assembly is rotatably coupled to said body,
        said cyclorotor assembly is rotatably coupled to said body,
        said rotor assembly and said cyclorotor assembly are coaxial,
        said telescoping boom assembly is coupled to said body, and
        said telescoping boom assembly is coaxial with said rotor assembly.

2. The powered aircraft of claim 1, further including a mechanism suitable for interfacing with payloads, said mechanism coupled to said telescoping boom assembly.

* * * * *